(12) United States Patent
Tooker et al.

(10) Patent No.: US 12,043,092 B2
(45) Date of Patent: *Jul. 23, 2024

(54) VEHICULAR REAR SLIDER WINDOW ASSEMBLY WITH UPPER RAIL FILLER HAVING AT LEAST ONE ANGLED END

(71) Applicant: Magna Mirrors of America, Inc., Holland, MI (US)

(72) Inventors: Troy F. Tooker, Holland, MI (US); David L. Guillozet, Hamilton, MI (US); David G. Douma, West Olive, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/457,265

(22) Filed: Dec. 2, 2021

(65) Prior Publication Data

US 2022/0089008 A1    Mar. 24, 2022

Related U.S. Application Data

(63) Continuation-in-part of application No. 16/565,543, filed on Sep. 10, 2019, now Pat. No. 11,247,546.

(Continued)

(51) Int. Cl.
*B60J 10/74* (2016.01)
*B60J 1/18* (2006.01)
(Continued)

(52) U.S. Cl.
CPC ............. *B60J 10/27* (2016.02); *B60J 1/1853* (2013.01); *B60J 10/15* (2016.02); *B60J 10/45* (2016.02)

(58) Field of Classification Search
CPC ... B60J 10/27; B60J 10/15; B60J 10/45; B60J 10/74; B60J 1/1853
(Continued)

(56) References Cited

U.S. PATENT DOCUMENTS 2,726,894 A * 12/1955 Bugbee .................... B60J 10/17
49/441
3,068,136 A * 12/1962 Reid ..................... B29C 44/505
264/46.7

(Continued)

FOREIGN PATENT DOCUMENTS

GB         2150966 A  *  7/1985  .............. B60J 10/17
JP      05038944 A  *  2/1993

*Primary Examiner* — Jerry E Redman
(74) *Attorney, Agent, or Firm* — HONIGMAN LLP

(57) ABSTRACT

A vehicular slider window assembly for a vehicle includes at least one fixed window panel and a movable window panel that is movable along an upper rail and a lower rail at the at least one fixed window panel between a closed position and an opened position. The upper rail includes a channel, and a filler is disposed in the channel of the upper rail. The filler includes a filler body having opposite side walls and at least one obliquely angled end, and the filler includes compressible and flexible and deformable elements along respective ones of the side walls. The obliquely angled end or ends of the filler provide an indication as to whether the filler is disposed in the channel of the upper rail at the correct orientation relative to the upper rail or the incorrect orientation relative to the upper rail.

30 Claims, 6 Drawing Sheets

Related U.S. Application Data

(60) Provisional application No. 62/729,706, filed on Sep. 11, 2018.

(51) Int. Cl.
*B60J 10/00* (2016.01)
*B60J 10/15* (2016.01)
*B60J 10/27* (2016.01)

(58) Field of Classification Search
USPC .................................. 49/440, 441, 413, 380
See application file for complete search history.

(56) References Cited

U.S. PATENT DOCUMENTS

| | | | |
|---|---|---|---|
| 3,333,364 A * | 8/1967 | Herr | B60J 10/248 |
| | | | 49/490.1 |
| 4,920,698 A | 5/1990 | Friese et al. | |
| 4,995,195 A | 2/1991 | Olberding et al. | |
| 5,007,202 A * | 4/1991 | Guillon | B60J 10/16 |
| | | | 277/921 |
| 5,146,712 A | 9/1992 | Hlavaty | |
| 5,228,740 A * | 7/1993 | Saltzman | B60J 1/1853 |
| | | | 49/404 |
| 5,377,449 A * | 1/1995 | Hineribara | B60J 10/16 |
| | | | 428/122 |
| 5,414,961 A * | 5/1995 | Tessier | B60J 10/16 |
| | | | 49/489.1 |
| 5,522,191 A | 6/1996 | Wenner et al. | |
| 5,531,046 A | 7/1996 | Kollar et al. | |
| 5,551,197 A | 9/1996 | Repp et al. | |
| 5,572,376 A | 11/1996 | Pace | |
| 5,799,444 A | 9/1998 | Freimark et al. | |
| 5,853,895 A | 12/1998 | Lewno | |
| 5,996,284 A | 12/1999 | Freimark et al. | |
| 6,026,611 A | 2/2000 | Ralston et al. | |
| 6,030,022 A * | 2/2000 | Bormann | B60J 10/77 |
| | | | 49/483.1 |
| 6,119,401 A | 9/2000 | Lin et al. | |
| 6,213,536 B1 * | 4/2001 | Raisch | B60J 10/77 |
| | | | 296/146.14 |
| 6,260,906 B1 * | 7/2001 | Buchholz | B60J 10/235 |
| | | | 49/490.1 |
| 6,301,834 B1 * | 10/2001 | Tyves | B60J 10/235 |
| | | | 49/489.1 |
| 6,691,464 B2 | 2/2004 | Nestell et al. | |
| 6,902,224 B2 | 6/2005 | Weinert et al. | |
| 6,955,009 B2 | 10/2005 | Rasmussen | |
| 7,003,916 B2 | 2/2006 | Nestell et al. | |
| 7,073,293 B2 | 7/2006 | Galer | |
| 7,571,569 B2 * | 8/2009 | Hiramatsu | B60J 10/30 |
| | | | 49/441 |
| 8,250,812 B2 | 8/2012 | Hebert et al. | |
| 8,316,583 B2 | 11/2012 | Lahnala | |
| 8,402,695 B2 | 3/2013 | Smith et al. | |
| 8,495,841 B2 | 7/2013 | DeGroff | |
| 8,881,458 B2 | 11/2014 | Snider et al. | |
| 8,915,018 B2 | 12/2014 | Snider | |
| 9,616,734 B2 * | 4/2017 | Clark | B60J 5/0402 |
| 9,878,599 B2 | 1/2018 | Lahnala | |
| 10,023,026 B2 | 7/2018 | Snider et al. | |
| 10,611,223 B2 * | 4/2020 | Nishikawa | B60J 10/16 |
| 10,857,867 B2 * | 12/2020 | Shigemura | B60J 10/16 |
| 11,247,546 B2 * | 2/2022 | Tooker | B29C 48/16 |
| 2001/0001916 A1 * | 5/2001 | Nozaki | B60J 10/74 |
| | | | 49/489.1 |
| 2001/0013203 A1 * | 8/2001 | Griesbach | B60J 10/00 |
| | | | 49/440 |
| 2001/0015034 A1 * | 8/2001 | Omori | B60J 10/74 |
| | | | 49/440 |
| 2003/0213179 A1 | 11/2003 | Galer | |
| 2004/0020131 A1 | 2/2004 | Galer et al. | |
| 2004/0098919 A1 * | 5/2004 | Bourque | B60J 1/1853 |
| | | | 49/413 |
| 2004/0144034 A1 | 7/2004 | Bourque et al. | |
| 2006/0005469 A1 * | 1/2006 | Bara | B60J 10/74 |
| | | | 49/440 |
| 2006/0010778 A1 * | 1/2006 | Drozd | B60J 10/17 |
| | | | 49/441 |
| 2006/0086053 A1 * | 4/2006 | Ellis | B60J 10/16 |
| | | | 49/441 |
| 2006/0103047 A1 * | 5/2006 | Zwolinski | B60J 10/15 |
| | | | 264/173.17 |
| 2006/0107600 A1 | 5/2006 | Nestell et al. | |
| 2007/0175101 A1 * | 8/2007 | Kanehara | B60J 10/50 |
| | | | 49/441 |
| 2008/0122262 A1 | 5/2008 | Cicala | |
| 2008/0127563 A1 | 6/2008 | Tooker | |
| 2009/0019778 A1 | 1/2009 | Lahnala | |
| 2010/0122494 A1 | 5/2010 | Lahnala | |
| 2010/0122497 A1 | 5/2010 | Lahnala | |
| 2012/0091114 A1 | 4/2012 | Ackerman et al. | |
| 2012/0110915 A1 | 5/2012 | Lahnala | |
| 2013/0255156 A1 | 10/2013 | Snider | |
| 2014/0047772 A1 | 2/2014 | Hulst | |
| 2015/0047264 A1 * | 2/2015 | Kobayashi | E06B 7/2303 |
| | | | 49/440 |
| 2015/0101254 A1 * | 4/2015 | Tooker | B60J 1/007 |
| | | | 49/476.1 |
| 2015/0314672 A1 | 11/2015 | Lahnala | |
| 2017/0036523 A1 * | 2/2017 | Tooker | B60J 1/1853 |
| 2017/0144524 A1 * | 5/2017 | Snider | E05D 15/0621 |
| 2020/0079186 A1 | 3/2020 | Snider et al. | |
| 2020/0079187 A1 | 3/2020 | Tooker et al. | |

* cited by examiner

US 12,043,092 B2

VEHICULAR REAR SLIDER WINDOW ASSEMBLY WITH UPPER RAIL FILLER HAVING AT LEAST ONE ANGLED END

CROSS REFERENCE TO RELATED APPLICATIONS

The present application is a continuation-in-part of U.S. patent application Ser. No. 16/565,543, filed Sep. 10, 2019, now U.S. Pat. No. 11,247,546, which claims the filing benefits of U.S. provisional application Ser. No. 62/729,706, filed Sep. 11, 2018, which is hereby incorporated herein by reference in its entirety.

FIELD OF THE INVENTION

The present invention relates to a slider window assembly for a vehicle and, more particularly, a rear slider window assembly for a vehicle and, more particularly, a rear slider window assembly for a pickup truck or the like.

BACKGROUND OF THE INVENTION

It is known to provide a slider window assembly for an opening of a vehicle, such as a rear slider window assembly for a rear opening of a pickup truck. Conventional slider window assemblies for rear openings of trucks or the like typically include three or more panels, such as two fixed window panels and a slidable window panel. The slidable window panel is supported by rails that may be adhesively bonded at the surface of the fixed window panels. The slidable window panel may be moved along the rails to open and close the window. The slidable window panel may be driven or moved by a cable drive system.

SUMMARY OF THE INVENTION

A rear slider window assembly has upper and lower rails or channels adhesively bonded at the inner surface of the fixed window panel or panels. The upper rail includes a filler and seal that is disposed in and along the U-shaped channel of the upper rail and that slidably receives the movable window panel therein. The seal comprises a plastic or rubber seal with a sealing lip and/or a cushioning or dampening lip or deformable element that may be co-extruded with the filler body. The lip or lips may comprise a softer material (such as a thermoset elastomer or rubber material, such as an Ethylene-Propylene-Diene-Monomer (EPDM) or a thermoplastic elastomer (TPE) or the like) as compared to the harder material of the filler body to provide the desired dampening feature. One or both ends of the filler are obliquely angled relative to the longitudinal axis of the seal to provide an assembly failsafe indicator that ensures that the seal is installed in the rail in the correct orientation.

These and other objects, advantages, purposes and features of the present invention will become apparent upon review of the following specification in conjunction with the drawings.

DESCRIPTION OF THE PREFERRED EMBODIMENTS

Figure 1:
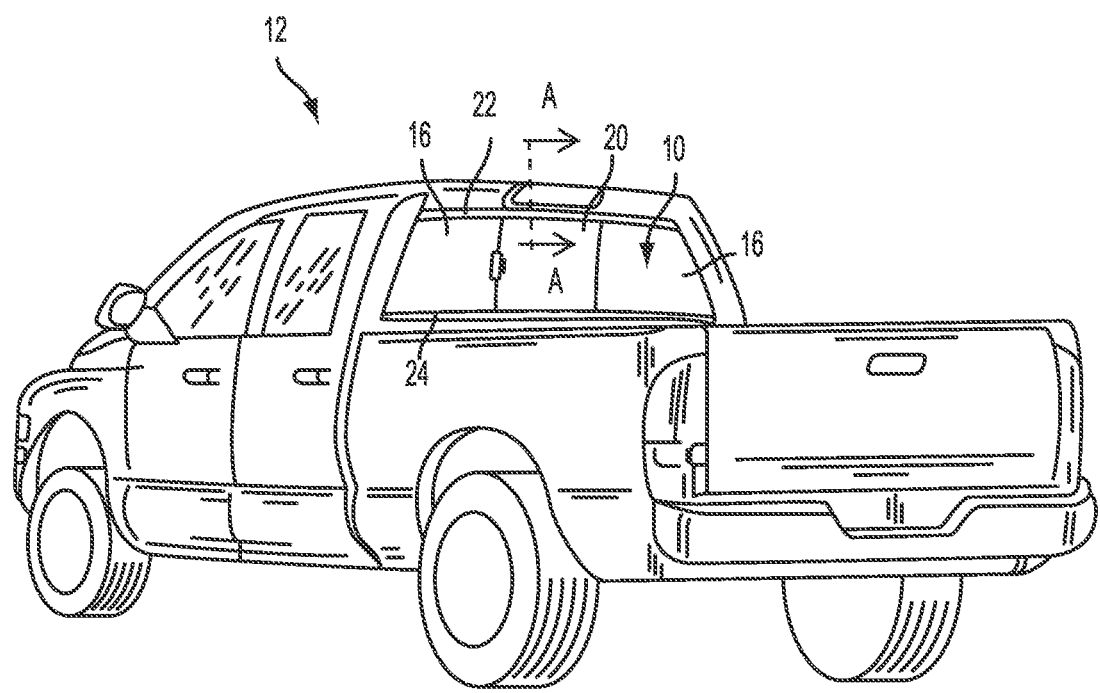
FIG. 1 is a rear perspective view of a pickup truck having a rear slider window assembly.

Referring now to the drawings and the illustrative embodiments depicted therein, a rear slider window assembly 10 of a vehicle 12 (such as a pickup truck or the like) includes a fixed window panel 16 (or a pair of fixed window panels) having an opening established therethrough, and a movable window panel 20 that is movable relative to a frame or rails 22, 24 and fixed window panel 16 between an opened position and a closed position (FIG. 1). The rails include an upper rail 22 and a lower rail 24, with the upper and lower edge regions of the movable window panel 20 (FIG. 1) movably or slidably received in and along the respective upper and lower rails 22, 24. The upper rail 22 includes a filler and seal 26 that is disposed in and along the U-shaped channel of the upper rail 24 and that slidably receives the movable window panel 20 therein, as discussed below.

In the illustrated embodiment, the window assembly comprises a hole-in-glass window configuration, where a single fixed glass panel 16 has an aperture or hole or opening established therethrough to define separate spaced apart fixed window panels or panel portions. Optionally, the window assembly may comprise two fixed window panels or panel portions that are spaced apart so as to define an opening therebetween (and with upper and lower appliqués or trim or filler panels or elements disposed at the upper and lower regions of the opening and between the fixed window panels).

Upper and lower rails 22, 24 may comprise any suitable channel or rail element configured to slidably receive an upper or lower edge portion of the movable window panel. Slider or movable window panel 20 is movable along lower rail 24 and upper rail 22 of frame portion 14 to open and close the aperture or opening, such as in a manner similar to known slider window assemblies. The movable window panel 20 may include or may be disposed at a lower carrier, which may receive the lower perimeter edge region of the slider window panel 20 therein and is slidably or movably received in the channel portion of the lower rail 24 of frame portion 14, while an upper region of the movable panel is slidably received in the filler 26 at the upper rail 22.

The upper rail 22 has an inverted generally U-shaped channel 22a that receives the filler 26 that slidably receives an upper edge region of the movable window panel 20 therein. A wiping seal may be disposed in or received in another channel 22b of the upper rail 22 for sliding or wiping engagement with the movable window panel 20 as the movable window panel moves along the channel portion between its opened and closed positions. The upper rail includes an attaching surface for attaching (such as via adhering or bonding) to the fixed window panel(s) and optionally for attaching the channel portion to the vehicle frame or sheet metal when the window assembly 10 is installed in the vehicle.

The filler or seal 26 comprises an extruded elongated plastic or rubber sealing element that provides a U-shaped receiving channel and that is configured to be disposed in the U-shaped channel 22a of the upper rail 22. The filler 26 comprises a body portion 26a that defines the U-shaped receiving channel, with a tab 26b that engages an edge of the upper rail 22 to position the filler in the upper rail.

Figure 2:
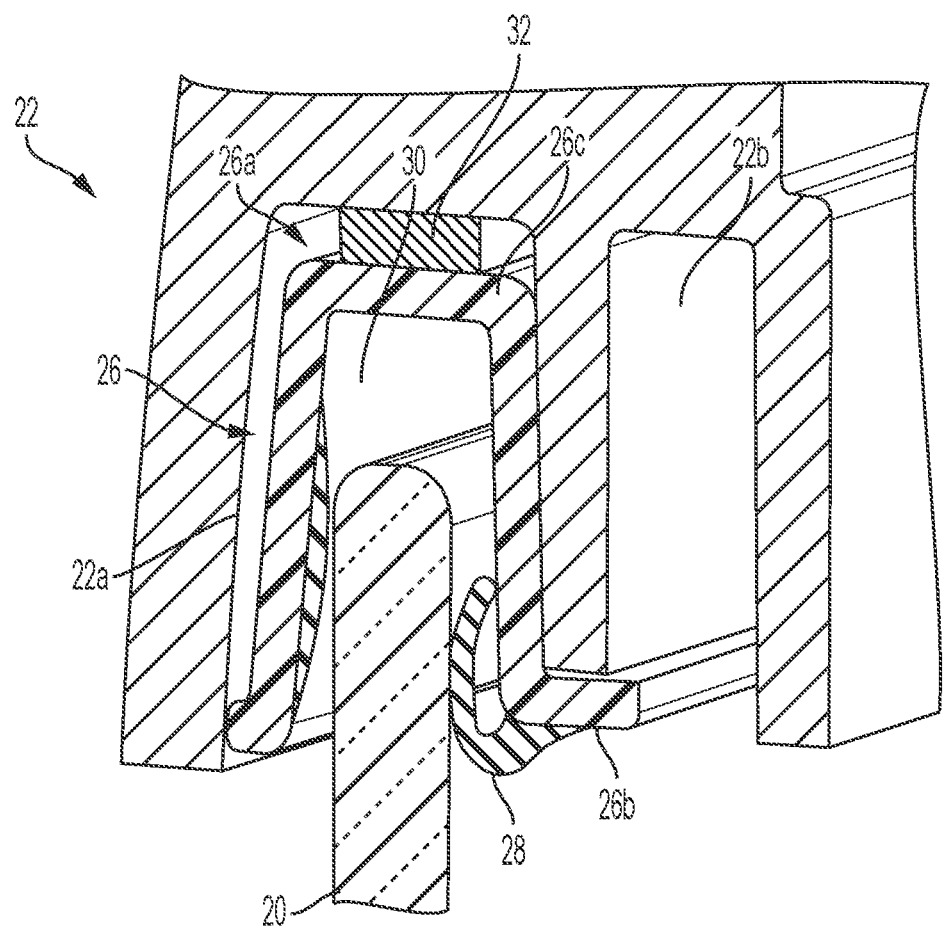
FIG. 2 is a perspective and sectional view of the upper rail taken along the line A-A of FIG. 1, showing the co-extruded filler engaging the movable window panel.
Figure 3:
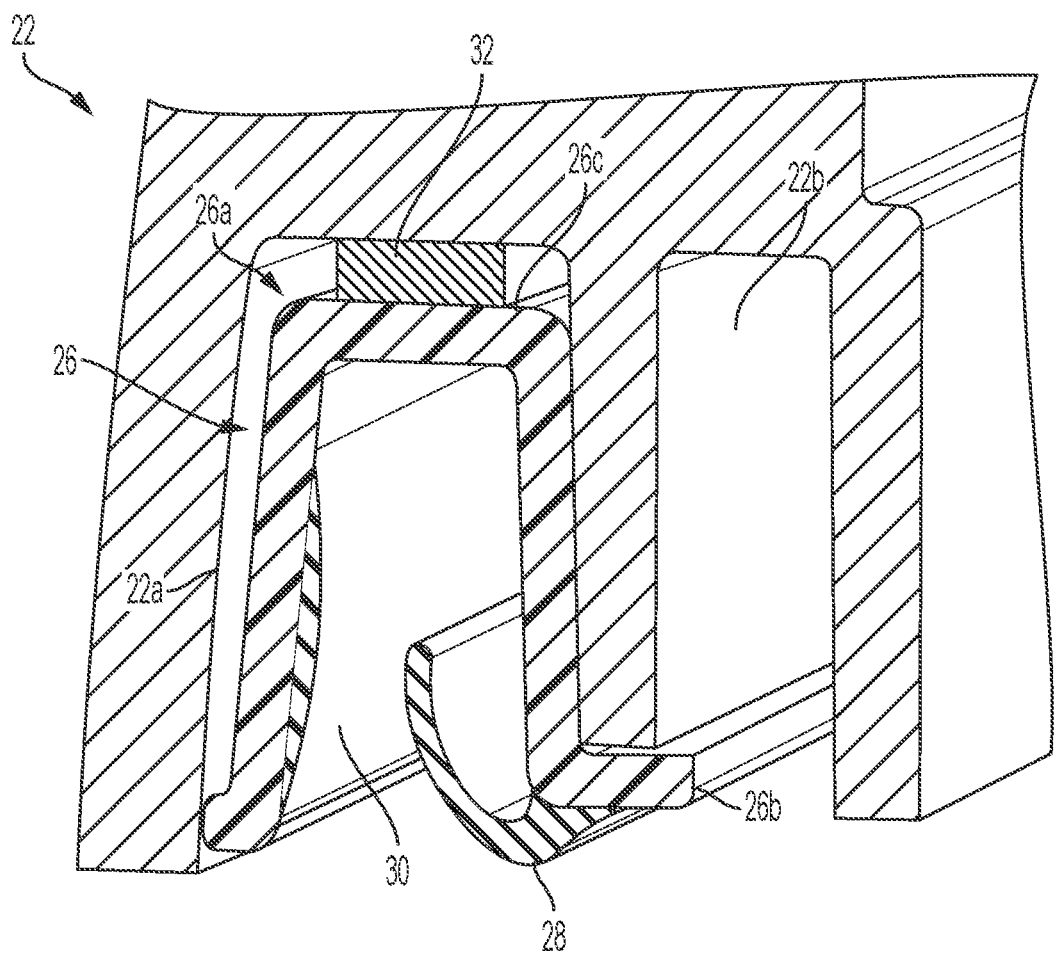
FIG. 3 is another perspective and sectional view of the upper rail taken along the line A-A of FIG. 1, showing the co-extruded filler without the movable window panel engaged therewith.
Figure 4:
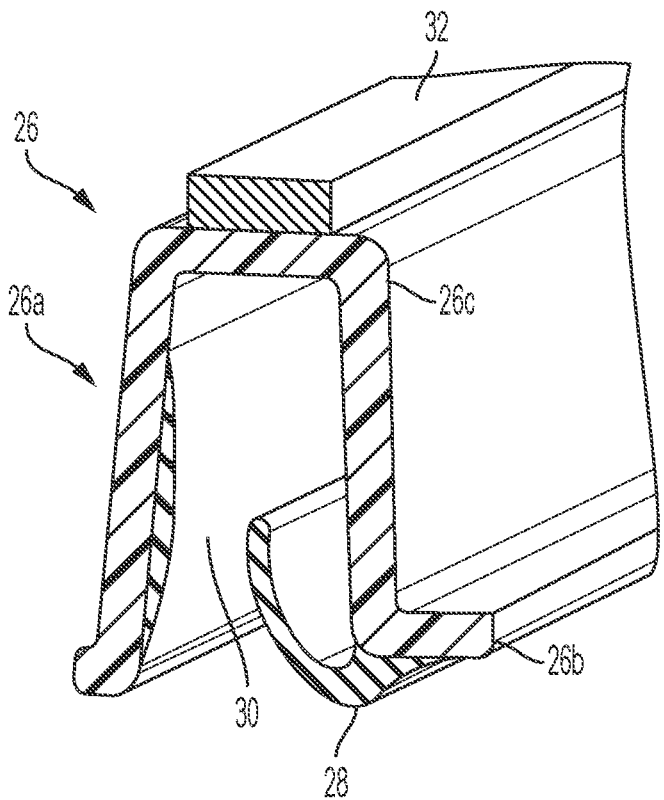
FIG. 4 is another perspective and sectional view of the co-extruded filler taken along the line A-A of FIG. 1.
Figure 5:
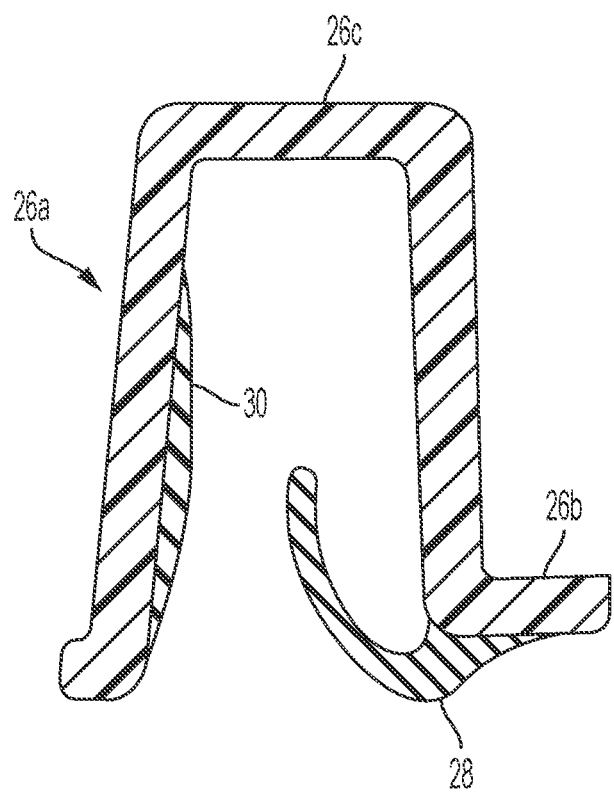
FIG. 5 is an end view of the co-extruded filler.

The filler 26 includes a first lip or deformable element 28 established at the tab 26b, and includes a second lip or raised portion or deformable element 30 at the wall of the body portion 26a opposite the wall at which the tab 26b and lip 28 are established. As shown in FIGS. 2-4, the filler 26 has a strip of tape 32 (or other suitable attaching element, such as adhesive or the like) disposed at and along the upper wall 26c of the filler body for attaching the filler to the upper surface of the U-shaped channel 22a of the upper rail 22.

The flexible lip 28 and the cushioning or dampening element or lip 30 are co-extruded with the filler body 26a. The co-extruded lip or lips may comprise a softer material (such as a thermoset elastomer or rubber material, such as EPDM or TPE the like) as compared to the filler body 26a to provide the desired dampening feature. In the illustrated embodiment, the lip 28 comprises a flexible lip that flexes when the movable window panel is received in the channel 22a and filler body 26a, while the lip 30 comprises a thicker material established along the opposite side of the channel of the filler body. The softer material lips compress when the window panel is received in the filler and upper rail, and provides a dampening or cushioning function at the window panel and function to reduce vibration of the window panel.

During manufacture of the filler, the lips 28, 30 are co-extruded with the filler body 26a. For example, the filler body may be extruded of a less flexible polymeric material (such as an engineered plastic material, such as Acrylonitrile Butadiene Styrene (ABS) or glass-filled nylon or polyvinylchloride material or the like), while the lips 28, 30 may be formed with (via co-extrusion with) the filler body, but formed out of a more flexible, compressible material. For example, the body may comprise any suitable plastic or polymeric material, and the lips 28, 30 may comprise a rubber or EPDM material or the like. One of the lips (e.g., lip 28) may comprise a flexible lip that is coextruded along a lower part of the filler body and that is formed so that it bends upward into the channel and flexes when engaged by the movable window panel. The other of the lips (e.g., lip 30) may comprise a thicker compressible wall material established or coextruded along the opposite wall of the channel of the filler body so as to narrow the width of the filler body channel, whereby the lip 30 compresses when the movable window panel is received in the channel.

The filler body (comprising a less flexible or non-compressible harder material), with the softer lips or elements extruded therealong, is inserted into the channel of the upper rail 22 and taped or adhesively attached therein via the tape or adhesive element 32. The less flexible or harder filler body provides the desired or appropriate shape for receiving the upper region of the movable window panel 20 therein, while the softer or compressible/flexible lips or elements engage the upper region of the window panel (see FIG. 2) to allow for movement of the window panel along the filler and channel of the rail while limiting movement in a direction transverse to the longitudinal axis of the filler and channel. The filler comprises a unitary element (formed during a multi-shot extrusion process or a co-extrusion process) that provides both the structural form feature and the flexible/compressible lips feature.

Therefore, the filler and window assembly provides enhanced cushioning and dampening of the movable window panel within the filler body channel. The softer compressible material of the lips 28, 30 provide the desired dampening feature, and is suitable for co-extruding the lips onto the filler body during the extrusion of the filler body. The extrusion of each lip may be done during a respective extrusion after forming the filler body or via a two shot extrusion or co-extrusion or tri-extrusion process to add the lips 28, 30 to the harder plastic filler body. Optionally, the filler body and the lips may be formed via a two-shot or co-extrusion process or a three-shot or tri-extrusion process.

Figure 6:
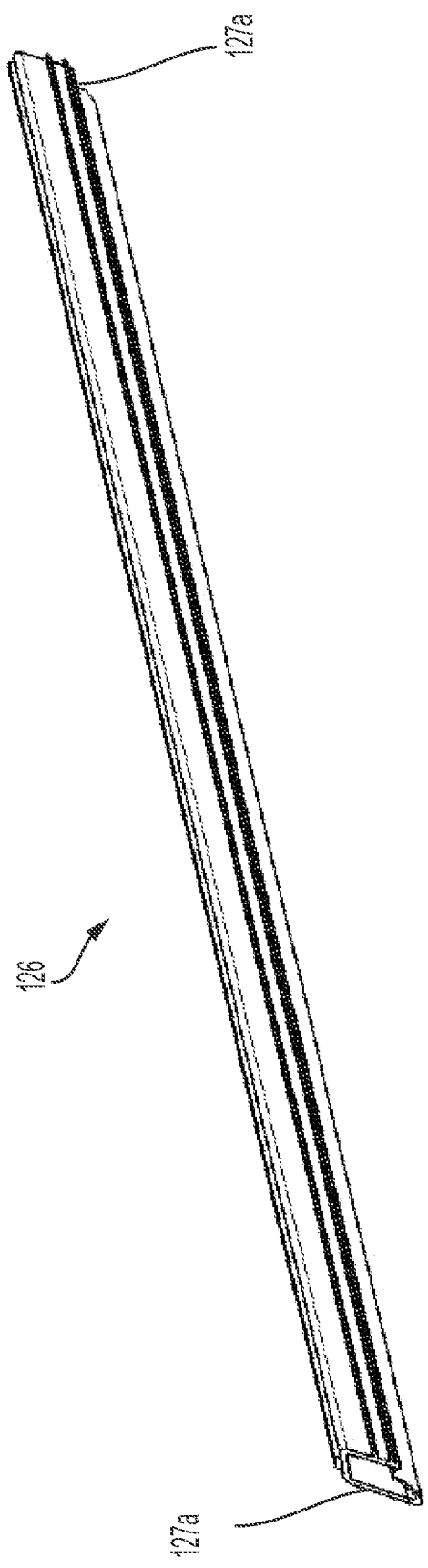
FIG. 6 is a perspective view of another co-extruded filler, shown with angled end regions.
Figure 7:
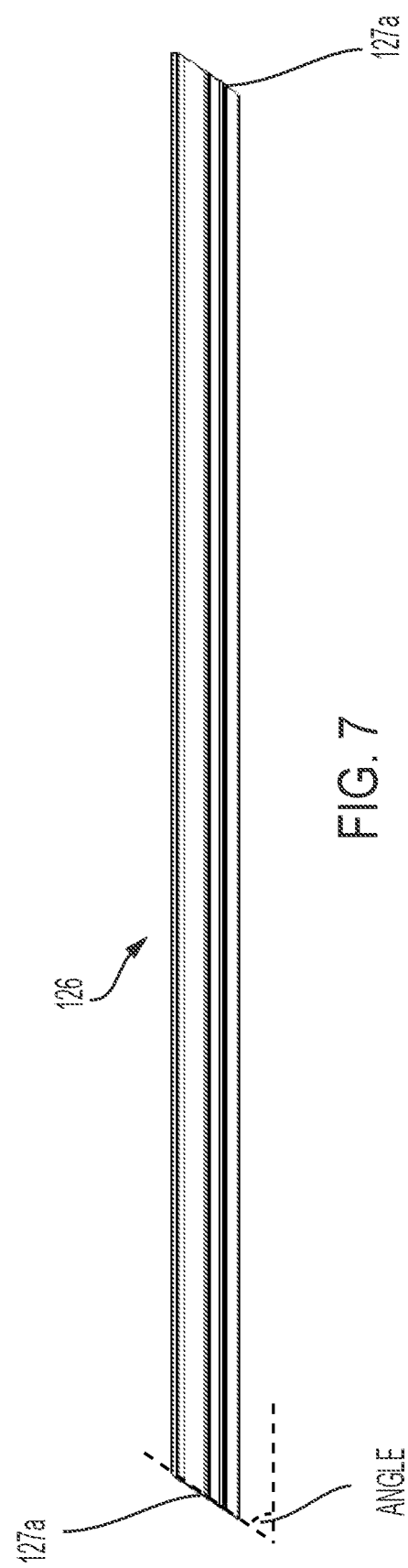
FIG. 7 is a side elevation of the co-extruded filler of FIG. 6.
Figure 8:
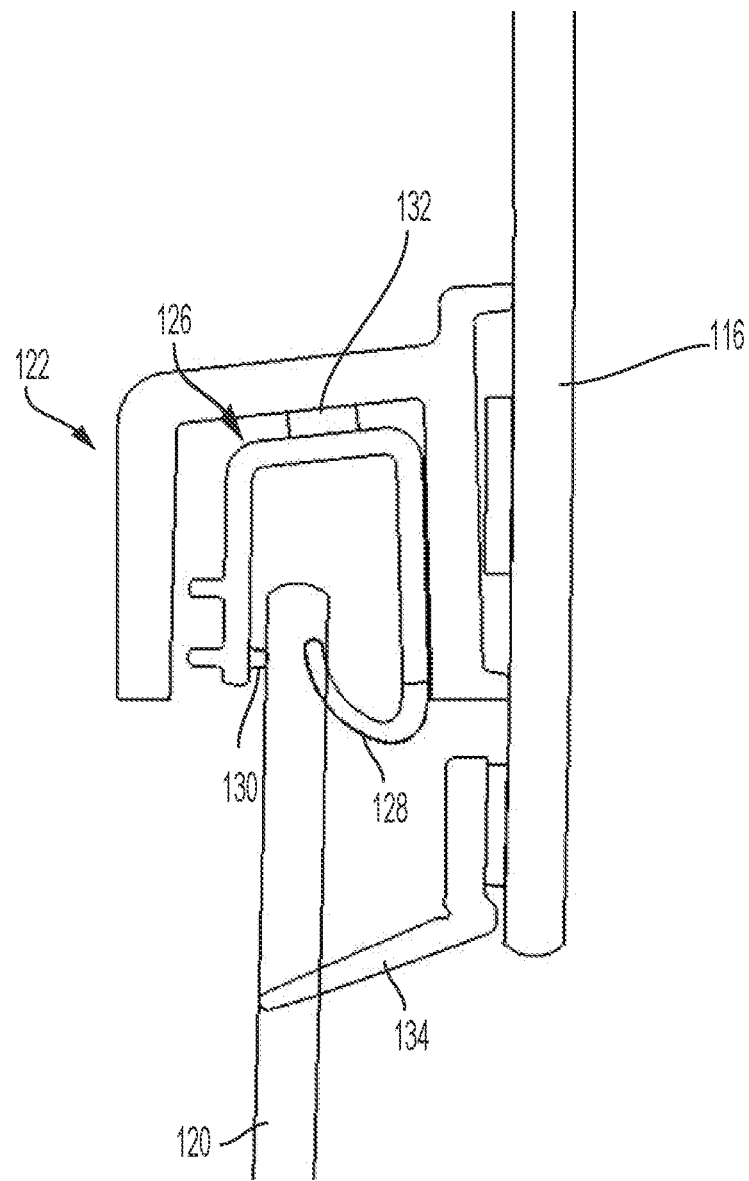
FIG. 8 is a sectional view of the filler of FIGS. 6 and 7 disposed within the upper rail of the window assembly.

Optionally, and such as shown in FIGS. 6 and 7, a co-extruded filler 126 may be of similar construction as described above, and with its ends 127a, 127b cut or formed at an angle to ease assembly of the window assembly. As shown in FIG. 8, the filler 126 has co-extruded sealing elements or dampening elements or deformable elements or lips 128, 130 formed along and fixed to the respective walls of the filler for engaging the respective sides or surfaces of the movable window panel 120. The filler comprises a co-extrusion, with the "hook" seal 128 and the "nub" seal 130 comprising a softer material (e.g., Santoprene) compared to the filler body. This helps with vibration. The filler has a strip of tape 132 (or other suitable attaching element, such as adhesive or the like) disposed at and along the upper wall of the filler body for attaching the filler to the upper surface of the U-shaped channel 22a of the upper rail 22, which is bonded or attached to the fixed window or applique 116. A lower or main sealing element or seal 134 is also bonded or attached to the fixed window panel or applique 116 and slidably engages the movable window panel 120 and limits or prevents water from entering between the fixed and movable glass panels. The filler 126 may be substantially similar in construction as the seal assembly or filler 26 described above such that a detailed discussion of the seals or fillers need not be repeated herein.

The ends of the filler 126 may be cut or angled at an oblique angle (see the "ANGLE" in FIG. 7) relative to the longitudinal axis of the filler to provide an assembly failsafe indicator that ensures that the filler is installed in the rail in the correct orientation. For example, the angle of the cut ends of the filler body 126 may comprise about a 45 degree angle (as shown in FIGS. 6 and 7) or an angle between about thirty degrees and about sixty degrees or thereabouts, or may be less than thirty degrees (but greater than zero degrees) or greater than sixty degrees (but less than ninety degrees), depending on the particular application of the filler and window assembly. The angle may be selected to be large enough to that the correct or incorrect orientation of the filler is readily discernible, such as less than or equal to about 70 or 75 degrees relative to the longitudinal axis. By having at least one of the ends of the filler body formed at an angle, assembly of the filler into the channel is enhanced. Thus, when the filler is installed in the channel of the rail, the angled end or ends clearly indicate that the filler is installed in the rail in the correct (or incorrect) orientation.

The filler has to be assembled in the rail with the "hook" seal 128 towards the outside of the window (to the right in FIG. 8). In order to ensure the correct orientation of the filler relative to the rail, one or both ends of the filler may be cut or angled (so as to be not 90 degrees relative to the longitudinal axis of the filler body) so it is readily apparent if the filler is installed in the opposite orientation. The angle cut may be made at one end, or both ends, of the filler to provide a failsafe indicator for the assembly fixture. This prevents the filler from being installed and taped 180 degrees incorrectly into the upper rail. The angled end edges may optionally be parallel to one another as can be seen in FIG. 7, or may be non-parallel, as long as they are not the exact opposite angle (e.g., angled 45 degrees at one end and 135 degrees (or −45 degrees) at the other end), whereby flipping the filler body 180 degrees would have the same appearance at the ends of the filler body.

Thus, the filler body may be formed (such as via extrusion) and the deformable elements may be disposed therealong (such as via co-extrusion with the filler body or such as via separate extrusion processes or attachment processes). The filler (comprising the formed filler body and the attached deformable elements) may then be cut at both ends so the filler has the selected or appropriate length, with one end (or both ends) of the filler being cut at an oblique angle relative to the longitudinal axis of the filler body. Optionally, the ends of the filler body may be cut prior to attachment of the deformable elements to the filler body, such as for applications where the deformable elements are attached via a separate extrusion or attachment or bonding process.

The upper and lower rails may comprise any suitable channel element configured to slidably receive the movable window panel and may be formed via any suitable forming means. For example, the channel portions and rails may be formed via an injection molding process. The rails may comprise any suitable material or materials, such as, for example, a rigid or substantially rigid molded polymeric material (such as a polyvinylchloride material or polycarbonate or PC—ABS or the like), and preferably a rigid polymeric material or engineered plastic material. The rails may be adhered or bonded to the respective window panels and/or sheet metal via any suitable adhesive, such as, for example, by utilizing aspects of the window assemblies described in U.S. Pat. Nos. 10,023,026; 5,551,197 and/or 5,853,895, which are hereby incorporated herein by reference in their entireties.

The movable window panel may be movable between its opened and closed positions via any suitable means, such as via manual pushing or pulling at the window panel and/or in response to actuation of a drive motor of a drive motor assembly or system, which may move cables or wires of cable assemblies relative to a sheath of the cable assemblies or the like to impart horizontal movement of the slider window panel 20 along the rails 22, 24. Optionally, the drive motor assembly may utilize aspects of the drive assemblies of the types described in U.S. Pat. Nos. 4,920,698; 4,995,195; 5,146,712; 5,531,046; 5,572,376; 6,955,009 and/or 7,073,293, and/or U.S. Publication Nos. US-2004-0020131 and/or US-2008-0127563, which are all hereby incorporated herein by reference in their entireties.

The benefits of embodiments of the slider window assembly may also be realized in vehicular movable window assemblies other than a rear slider window assembly for a pickup truck or the like, such as (for example) a slider window assembly suitable for use as a movable side window for a vehicle such as a van or a bus. The window assembly may utilize aspects of the elements and window assemblies described in U.S. Pat. Nos. 8,915,018 and/or 8,881,458, which are hereby incorporated herein by reference in their entireties.

Optionally, the fixed window panel and movable window panel of the window assembly may include one or more electrically conductive elements, such as heater grids or the like, which may be powered utilizing aspects of the window assemblies described in U.S. Pat. Nos. 8,402,695 and/or 8,881,458, which are hereby incorporated herein by reference in their entireties. The window assembly may include a heater grid on each of the fixed window panels and on the movable window panels, with a heating system that provides power to the heater grid on the movable window panel irrespective of the position of the movable window panel relative to the fixed window panel and throughout the range of movement of the movable window panel between its opened and closed positions, such as by utilizing aspects of the window assemblies described in U.S. Pat. No. 8,402,695 and/or 8,881,458, incorporated above.

Optionally, the window assembly or assemblies may utilize aspects of the window assemblies described in U.S. Pat. Nos. 8,915,018; 8,881,458; 8,402,695; 7,073,293; 7,003,916; 6,119,401; 6,026,611; 5,996,284; 5,799,444 and/or 6,691,464, and/or U.S. Publication Nos. US-2014-0047772; US-2006-0107600; US-2008-0127563; US-2004-0020131 and/or US-2003-0213179, all of which are hereby incorporated herein by reference in their entireties.

Changes and modifications to the specifically described embodiments may be carried out without departing from the principles of the present invention, which is intended to be limited only by the scope of the appended claims, as interpreted according to the principles of patent law.

The invention claimed is:

1. A vehicular slider window assembly, the vehicular slider window assembly comprising:

at least one fixed window panel, the at least one fixed window panel defining an opening;

an upper rail and a lower rail attached at the at least one fixed window panel;

wherein the upper rail comprises a channel;

a filler disposed in the channel of the upper rail;

wherein the filler comprises a filler body having a first side wall along a filler channel and a second side wall along the filler channel and opposite the first side wall, and wherein the filler comprises a first deformable element along the first side wall of the filler body and a second deformable element along the second side wall of the filler body;

wherein the filler body has a first end and a second end opposite the first end, and wherein the first end of the filler body is at a first angle relative to a longitudinal axis of the filler body, and wherein the second end of the filler body is at a second angle relative to the longitudinal axis of the filler body, and wherein at least one selected from the group consisting of (i) the first angle comprises an oblique angle and (ii) the second angle comprises the oblique angle;

wherein one selected from the group consisting of (i) the first end at the first angle and the second end at the second angle are parallel to one another and (ii) the first end at the first angle and the second end at the second angle are non-parallel to one another;

wherein the first angle and the second angle are not exact opposites of one another relative to the longitudinal axis of the filler body;

a movable window panel that is movable along the upper rail and the lower rail, with an upper region of the movable window panel received in the filler channel of the filler in the channel of the upper rail;

wherein the movable window panel is movable between a closed position, where the movable window panel is disposed at the opening, and an opened position, where the movable window panel is disposed at least partially along the at least one fixed window panel;

wherein each of the first and second deformable elements comprises a compressible and flexible material and provides a dampening and cushioning function at the movable window panel when the upper region of the movable window panel is received in the filler channel of the filler in the channel of the upper rail; and wherein the filler body comprises a material different than the compressible and flexible material of the first and second deformable elements of the filler.

2. The vehicular slider window assembly of claim 1, wherein the first end at the first angle and the second end at the second angle are non-parallel to one another.

3. The vehicular slider window assembly of claim 1, wherein the first end at the first angle and the second end at the second angle are parallel to one another.

4. The vehicular slider window assembly of claim 1, wherein the oblique angle is greater than thirty degrees and less than sixty degrees relative to the longitudinal axis of the filler body.

5. The vehicular slider window assembly of claim 1, wherein at least one end of the first deformable element and at least one end of the second deformable element are at the oblique angle relative to the longitudinal axis of the filler body.

6. The vehicular slider window assembly of claim 1, wherein the filler body comprises a plastic material.

7. The vehicular slider window assembly of claim 6, wherein the first and second deformable elements comprise a pliable rubber material.

8. The vehicular slider window assembly of claim 7, wherein the first and second deformable elements comprise EPDM or TPE material.

9. The vehicular slider window assembly of claim 1, wherein the first deformable element comprises a flexible lip that extends from the first side wall of the filler body.

10. The vehicular slider window assembly of claim 9, wherein the second deformable element comprises a compressible layer of material at and along the second side wall of the filler body.

11. The vehicular slider window assembly of claim 10, wherein the first and second deformable elements are disposed at the respective first and second side walls so as to protrude into the filler channel and into contact with opposite sides of the movable window panel.

12. The vehicular slider window assembly of claim 1, wherein the first and second deformable elements are extruded onto and along the respective first and second side walls of the filler body.

13. The vehicular slider window assembly of claim 1, wherein the filler body and the first and second deformable elements are formed via a two-shot extrusion process.

14. The vehicular slider window assembly of claim 1, wherein the filler body and the first and second deformable elements are formed via a three-shot extrusion process.

15. The vehicular slider window assembly of claim 1, wherein the at least one fixed window panel comprises a single fixed window panel having an opening therethrough.

16. The vehicular slider window assembly of claim 1, wherein the at least one fixed window panel comprises first and second fixed window panels defining an opening therebetween.

17. The vehicular slider window assembly of claim 1, wherein the first deformable element is affixed along the first side wall of the filler body and the second deformable element is affixed along the second side wall of the filler body.

18. The vehicular slider window assembly of claim 17, and wherein the first and second deformable elements are separate and distinct from one another and spaced apart from one another.

19. A vehicular slider window assembly, the vehicular slider window assembly comprising:

at least one fixed window panel, the at least one fixed window panel defining an opening;

an upper rail and a lower rail attached at the at least one fixed window panel;

wherein the upper rail comprises a channel;

a filler disposed in the channel of the upper rail;

wherein the filler comprises a filler body having a first side wall along a filler channel and a second side wall along the filler channel and opposite the first side wall, and wherein the filler comprises a first deformable element along the first side wall of the filler body and a second deformable element along the second side wall of the filler body;

wherein the filler body has a first end and a second end opposite the first end, and wherein the first end of the filler body is at an oblique angle relative to a longitudinal axis of the filler body, and wherein the second end of the of the filler body is at the oblique angle relative to the longitudinal axis of the filler body;

wherein the first end at the oblique angle and the second end at the oblique angle are parallel to one another;

a movable window panel that is movable along the upper rail and the lower rail, with an upper region of the movable window panel received in the filler channel of the filler in the channel of the upper rail;

wherein the movable window panel is movable between a closed position, where the movable window panel is disposed at the opening, and an opened position, where the movable window panel is disposed at least partially along the at least one fixed window panel;

wherein each of the first and second deformable elements comprises a compressible and flexible material and provides a dampening and cushioning function at the movable window panel when the upper region of the movable window panel is received in the filler channel of the filler in the channel of the upper rail;

wherein the filler body comprises a material different than the compressible and flexible material of the first and second deformable elements of the filler; and wherein at least one selected from the group consisting of (i) the first deformable element at least partially covers the first side wall of the filler body and (ii) the second deformable element at least partially covers the second side wall of the filler body.

20. The vehicular slider window assembly of claim 19, wherein the oblique angle is greater than thirty degrees and less than sixty degrees relative to the longitudinal axis of the filler body.

21. The vehicular slider window assembly of claim 19, wherein at least one end of the first deformable element and at least one end of the second deformable element are at the oblique angle relative to the longitudinal axis of the filler body.

22. The vehicular slider window assembly of claim 19, wherein the filler body comprises a plastic material.

23. The vehicular slider window assembly of claim 22, wherein the first and second deformable elements comprise a pliable rubber material.

24. The vehicular slider window assembly of claim 19, wherein the first deformable element is affixed along the first side wall of the filler body and the second deformable element is affixed along the second side wall of the filler body.

25. A vehicular slider window assembly, the vehicular slider window assembly comprising:
at least one fixed window panel, the at least one fixed window panel defining an opening;
an upper rail and a lower rail attached at the at least one fixed window panel;
wherein the upper rail comprises a channel;
a filler disposed in the channel of the upper rail;
wherein the filler comprises a filler body having a first side wall along a filler channel and a second side wall along the filler channel and opposite the first side wall, and wherein the filler comprises a first deformable element along the first side wall of the filler body and a second deformable element along the second side wall of the filler body;
wherein the filler body has a first end and a second end opposite the first end, and wherein the first end of opposite ends of the filler body is at a first oblique angle relative to a longitudinal axis of the filler body, and wherein the second end of the filler body is at a second oblique angle relative to the longitudinal axis of the filler body;
wherein the first end at the first oblique angle and the second end at the second oblique angle are non-parallel to one another, and wherein the first oblique angle and the second oblique angle are not exact opposites of one another relative to the longitudinal axis of the filler body;
a movable window panel that is movable along the upper rail and the lower rail, with an upper region of the movable window panel received in the filler channel of the filler in the channel of the upper rail;
wherein the movable window panel is movable between a closed position, where the movable window panel is disposed at the opening, and an opened position, where the movable window panel is disposed at least partially along the at least one fixed window panel;
wherein each of the first and second deformable elements comprises a compressible and flexible material and provides a dampening and cushioning function at the movable window panel when the upper region of the movable window panel is received in the filler channel of the filler in the channel of the upper rail;
wherein the filler body comprises a material different than the compressible and flexible material of the first and second deformable elements of the filler; and
wherein at least one selected from the group consisting of (i) the first deformable element comprises a compressible wall of material at and along the first side wall of the filler body, the compressible wall of material at least partially covering the first side wall of the filler body, and (ii) the second deformable element comprises a compressible wall of material at and along the second side wall of the filler body, the compressible wall of material at least partially covering the second side wall of the filler body.

26. The vehicular slider window assembly of claim 25, wherein the first oblique angle and the second oblique angle are both respectively greater than thirty degrees and less than sixty degrees relative to the longitudinal axis of the filler body.

27. The vehicular slider window assembly of claim 25, wherein a first end of the first deformable element at the first end of the filler body and a first end of the second deformable element at the first end of the filler body are at the first oblique angle relative to the longitudinal axis of the filler body.

28. The vehicular slider window assembly of claim 25, wherein the filler body comprises a plastic material.

29. The vehicular slider window assembly of claim 28, wherein the first and second deformable elements comprise a pliable rubber material.

30. The vehicular slider window assembly of claim 25, wherein the first deformable element is affixed along the first side wall of the filler body and the second deformable element is affixed along the second side wall of the filler body.

* * * * *

UNITED STATES PATENT AND TRADEMARK OFFICE
CERTIFICATE OF CORRECTION

PATENT NO. : 12,043,092 B2
APPLICATION NO. : 17/457265
DATED : July 23, 2024
INVENTOR(S) : Troy F. Tooker et al.

Page 1 of 1

It is certified that error appears in the above-identified patent and that said Letters Patent is hereby corrected as shown below:

In the Claims

<u>Column 9</u>
Claim 25, Lines 21-22, "first end of opposite ends of the filler body" should be --first end of the filler body--

Signed and Sealed this
Twenty-first Day of January, 2025

Coke Morgan Stewart
*Acting Director of the United States Patent and Trademark Office*